United States Patent Office 3,005,811
Patented Oct. 24, 1961

3,005,811
PROCESS FOR POLYMERIZING DIOLEFINS IN PRESENCE OF VINYL CYCLOOLEFIN
Edward A. Youngman, Lafayette, Calif., assignor to Shell Oil Company, a corporation of Delaware
No Drawing. Filed Apr. 25, 1958, Ser. No. 730,807
14 Claims. (Cl. 260—94.3)

This invention relates to the polymerization of diolefins. More particularly, the invention relates to an improved process for polymerizing conjugated diolefins using certain metallic catalysts.

Specifically, the invention provides a new and improved process for polymerizing conjugated diolefins with certain metallic catalysts which gives products having a high cis 1,4 structure and improved processing properties. The process comprises contacting the conjugated diolefin with a metal salt of the group consisting of divalent cobalt and nickel halides or nitrates, preferably in combination with an organo metal compound, in the presence of at least .2 times the weight of the monomer of a vinyl cycloolefin, such as vinylcyclohexene-3.

It has been found that polybutadienes having high cis 1,4 structure can be cured to form rubber products having outstanding physical properties, such as excellent resiliency, particularly at lower temperature, good abrasion resistance and the like. Polymers having a high cis 1,4 content can be obtained by polymerizing the butadiene in the presence of nickel or cobalt halides as disclosed in copending case Serial No. 696,924, filed November 18, 1957. The polymers prepared by the method, however, are rather difficult to mill due to their high molecular weight. Efforts have been employed to produce lower molecular weights by conventional techniques but such methods have failed either because there was little or no effect on molecular weight or the modification changed the stereospecific nature of the polymer so as to cause a loss of many desired properties.

Accordingly, it is an object of the invention to provide a new process for polymerizing diolefins. It is a further object to provide a new process for preparing polymers of conjugated diolefins that have a high cis 1,4 structure. It is a further object to provide a process for preparing polymers of conjugated diolefins having a high cis 1,4 structure and better milling properties. It is a further object to provide new polymers of butadiene having very high cis 1,4 structure and intrinsic viscosities preferably between 1.0 and 3.5. These and other objects of the invention will be apparent from the following detailed description thereof.

It has now been discovered that these and other objects may be accomplished by the process of the invention which comprises contacting the conjugated diolefin with a metal salt of the group consisting of divalent nickel and cobalt halides, or nitrates, preferably in combination with an organo metal compound, in the presence of at least .2 times the weight of the monomer of a vinyl cycloolefin, such as vinylcyclohexene-3. It has been found that by the use of this special process one is able to obtain polymers of the conjugated diolefins which have high cis 1,4 structure and at the same time much better milling properties. For example, with the above process one is now able to obtain polymers of butadiene having a cis 1,4 content of above 96% and intrinsic viscosities varying from about 1.0 to 3.5. Prior polymers of this type having the poor milling properties, on the other hand, had intrinsic viscosities as high as 8.5.

It has also been found that the process provides a good means for preparing polymers of predetermined molecular weight. By controlling the amount of the vinyl cycloolefins, such as by employing mixtures of the vinylcycloolefins with other solvents as benzene and the like, one can produce polymers having any desired molecular weights.

It was unexpected to find that the above-noted products could be obtained by this method because the use of other solvents, such as benzene and cyclohexene, showed little if any effect on reducing the intrinsic viscosities and improving milling properties. In addition, it was surprising to find that a compound as vinylcyclohexene-3 which had a vinyl side chain, did not enter the polymer molecule and form a copolymer with the butadiene. When used in the present process, however, the vinylcyclohexene-3 does not undergo conventional copolymerization and the polymer is substantially free of the vinylcyclohexene units.

The process of the invention may be applied to the polymerization of any hydrocarbon conjugated diolefin. It is particularly useful for the polymerization of butadiene as this conjugated diolefin is found to polymerize, according to the present invention, with ease and to produce a polymer having a very high proportion of the cis 1,4 configuration. Other conjugated diolefins may be employed, however, such as, for example, 2,3-dimethyl butadiene-1,3,2-ethyl butadiene-1,3, isoprene, 4-methyl hexadiene-1,3,2-methyl pentadiene 1,3,2-isopropyl butadiene-1,3, octatriene-2,4,6, 2-amyl butadiene-1,3, piperylene and the like. Not only may any conjugated diolefin be polymerized but two or more conjugated dienes may be copolymerized to produce the desired products. A representative copolymer of this type is, for example, a copolymer of butadiene and isoprene prepared according to the present invention.

The catalysts used in the polymerization comprise the cobalt and nickel halides or nitrates or mixtures thereof. In all cases, the cobalt and nickel are in the divalent state. Examples of these include, among others, cobaltous bromide, cobaltous fluoride, cobaltous iodide, nickelous bromide, nickelous iodide, and nickelous fluoride, nickel nitrate, cobalt nitrate and the like. Particularly preferred are the bromides and chlorides of cobalt and nickel. In the preferred embodiment, the salts are utilized in the purified form free of water of crystallization.

The cobalt and nickel salts may be used alone or in combination with organo metallic cocatalysts. These cocatalysts may be any of the compounds having an organo radical, and preferably an alkyl radical, attached directly to metals, such as, for example, metal trialkyls, metal dialkyl halides and metal monoalkyl dihalides and metal dialkyl hydrides. Examples include, among others, aluminum alkyls, lithium alkyls, zirconium alkyls, cobalt alkyls and the like, such as aluminum tributyl, aluminum triethyl, aluminum triisobutyl, aluminum triamyl, aluminum triisopropyl, aluminum isobutyl sesquihalide, aluminum diethyl hydride, aluminum butyl dichloride, and the like. Especially preferred are those having alkyl groups containing from 1 to 8 and particularly 1 to 6 carbon atoms.

The catalysts may be added as such or in combination with a solid carrier, or in solvent solution. It is usually preferred to employ a solvent solution. Suitable solvents include the above-noted vinylcycloolefins, benzene, toluene, xylene and the like. If solvent solutions are employed they generally comprise from about 3% to 10% of the total polymerization mixture. As noted hereinafter, it is sometimes desirable to employ other solvents, such as cycloaliphatic and aromatic hydrocarbons, so as to prepare a polymer of predetermined molecular weight.

The amount of the nickel or cobalt catalyst employed may vary. In general, only small amounts, e.g. amounts ranging from about .001 to about 0.01 mole per mole of the conjugated diene, are very satisfactory. Larger amounts of the catalyst, e.g. 0.01 to 0.1 mole may be employed but there appears to be no substantial advantage obtained by using such larger amounts.

When using the cocatalysts with the above-described nickel or cobalt salts, the ratio of the components may vary over a considerable range. In some cases, the weight ratio of the metal salt to organo metallic compound may vary from about 1.5:1 to about 1:50. Preferably, the metal salt and organo metallic compounds are utilized in weight ratios varying from about 1:5 to 1:35.

The polymerization is accomplished by contacting the monomer to be polymerized with the above-described catalysts in the presence of a vinyl cycloolefin. The preferred member of this group comprises 1-vinyl-cyclohexene-3 of the formula

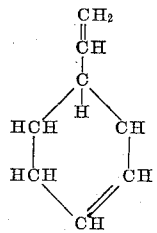

It is seen that this compound contains a vinyl group attached to a saturated ring carbon atom present in an alicyclic hydrocarbon radical containing a double bond which is not conjugated with the vinyl double bond. Other compounds of this include, among others, 1-vinyl-4 - methyl - cyclohexene - 3, 1,3 - dimethyl - 1 - vinylcyclohexene-3, 1-vinyl-cyclopentene-3, 1-vinylcyclobutene-2, limonene, 3,5-diethyl-1-vinyl-cyclopentene-2, and the like, and mixtures thereof.

The amount of the vinyl cycloolefin employed in the process should be at least .2 times that of the combined weight of monomers to be employed. Preferably the amount of vinyl cycloolefin should be about .5 to 4 times the combined weight of monomer to be used. The exact amount selected will be determined by the molecular weight (as represented by intrinsic viscosity determinations) desired, the use of the larger amounts of the vinyl cycloolefins giving the lower molecular weights and the use of the smaller amounts giving the higher molecular weights. As noted in case the smaller amounts are used, other solvents, such as the aromatic and cycloaliphatic solvents may be used in admixture with the vinylcycloolefins so as to give a workable solution.

The temperature employed will depend upon the exact catalyst utilized. Temperatures generally range from about 0° C. to about 100° C. Temperatures between 15° C. and 60° C. are particularly preferred as they generally give products having a higher proportion of the cis-1,4 addition product.

The process is conducted in an inert atmosphere. This is preferably accomplished by first sweeping out the reaction zone with an inert gas. Suitable inert materials include nitrogen, methane, and the like.

The process should also be conducted under substantially anhydrous conditions. This is accomplished by using anhydrous reactants and dry reaction vessels and maintaining customary precautions during the reaction to keep water out of the reaction vessel.

The most convenient operating pressure is that which is created by the system and will vary depending upon the specific nature of conjugated diene, the solvent, and their respective amounts. For convenience, such pressures are termed "autogenic" pressures. If desired, higher or lower pressures may be employed.

A particularly preferred method of operation is to combine the solvent and catalyst, introduce the monomer into this mixture and then heat the combined mixture to the desired temperature. In the case of monomers, such as butadiene, it is preferred to add the catalyst to the solvent, and then introduce the dry butadiene into the solvent-catalyst mixture over a period of time. The rate of addition is preferably such that the heat of reaction is dispersed without the application of external cooling means. External cooling means may be applied if desired, however, to speed the rate of addition. In this preferred method of operation, the time required for the reaction will depend upon the rate of addition of monomer as well as the reaction temperature. At the preferred temperature of 15° C. to 60° C. with the addition of butadiene over a period of time, the polymerization can conveniently be carried out in from about 30 minutes to about 4 hours.

The reaction mixture is preferably agitated during the course of the reaction. This may be accomplished by mounting the reactor on a rocker or by use of suitable stirrers. Further, the reactor should preferably be equipped with suitable inlets for feeding the monomer and a set of inlets and outlets for circulating an inert gas to purge air from the vessel. A separate inlet may be supplied whereby catalyst may be added during the course of the reaction. If continuous operations are to be employed then the inlet for catalyst and solvent is necessary as well as an outlet for the continuous withdrawal of polymer solution.

At the completion of the reaction, the mixture is then treated with a proton donor to deactivate the metal catalyst. This includes material having active hydrogen, such as water, mineral or organic acids, mercaptans, alcohols and the like. This is preferably accomplished by addition of a small amount of isopropyl alcohol. A larger amount of the alcohol may then be added to coagulate the polymer.

The polymers prepared by the process of the invention will have a high 1,4 structure, e.g. at least 90% and preferably above 96% cis 1,4 structure, as determined by infrared analysis. They will preferably have intrinsic viscosities no greater than 3.5 and preferably between 1.5 and 3.0. These instrinsic viscosities are determined in toluene by conventional procedure.

The polymers prepared by the process of the invention may be utilized for a great many important industrial applications. The polymers may be used, for example, in the preparation of molded rubber articles, such as tires, belts, tubes and the like or may be added alone or with other polymeric materials to known rubber compositions to improve specific properties, such as impact resistance. The polymers of the invention may also be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients, such as, for example, tackifiers, plasticizers, stabilizers, vulcanizing agents, oils, carbon black and the like, and then heating to effect vulcanization. Preferred vulcanizing agents include, among others, sulfur, sulfur chloride, sulfur thiocyanate, thiuram polysulfides and other organic polysulfides. These agents are preferably used in amounts varying from about 0.1 part to 10 parts per 100 parts of rubber. Vulcanization temperatures preferably range from about 100° C. to about 175° C. Preferred temperatures range from about 125° C. to 175° C. for a period of 15 to 60 minutes.

To illustrate the manner in which the invention may be carried out, the following examples are given. It is to be understood, however, that the examples are for the purpose of illustration and the invention is not to be regarded as limited by any of the specific conditions cited therein.

*Example 1*

This example illustrates the preparation of the polybutadiene having a high cis 1,4 content employing an anhydrous cobaltous chloride-aluminum ethyl sesquichloride catalyst in the presence of 1-vinyl-cyclohexene-3.

Forty parts of vinyl cyclohexene-3, 12 parts of dry butadienes and 2 parts of benzene solution of catalyst containing 6 parts and 200 parts respectively of $CoCl_2$ and $Al_2Cl_3(C_2H_5)_3$ per million of reaction mixture were added to a glass ampoule. Nitrogen was passed into the ampoule to remove any molecular oxygen and the ampoule then sealed and maintained at about 30° C. for several hours. The ampoule was then opened and 1 part of isopropyl alcohol added to kill the catalyst. The reaction mixture was then poured into isopropyl alcohol to coagulate the polybutadiene. The polymer was washed and dried. Infrared analysis indicated the polymer had the following structure: 97.9% cis-1,4, 1.3% 1,2 and 0.8% trans 1,4. Instrinsic viscosity in toluene was 2.21.

A related experiment conducted in the presence of benzene instead of the vinylcyclohexene-3, gave a product having an intrinsic velocity in toluene of 5.8.

One hundred parts of the polybutadiene prepared in the presence of vinylcyclohexene-3 was mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part of sulfur and the resulting product cured for 25 minutes at 135° C. The milling was much easier than with the higher molecular weight product produced above without the vinylcycloolefin. The resulting product was a hard rubbery sheet having good resiliency, which is retained even at low temperatures, and good abrasion resistance.

Example II

This example illustrates the preparation of polybutadiene having high cis 1,4 content employing a cobaltous chloride-aluminum tri-isobutyl catalyst in the presence of 1-vinyl-cyclohexene-3.

Forty parts of vinyl cyclohexene-3, 12 parts of dry butadiene and 2 parts of a benzene solution of catalyst prepared by reacting 18 parts $CoCl_2$ (anhydrous) with 9 parts aluminum triisobutyl in 300 parts benzene were added to a glass ampoule. Nitrogen was passed into the ampoule to remove any molecular oxygen and the ampoule then sealed and maintained at about 30° C. for several hours. The ampoule was then opened and one part of isopropyl alcohol added to the reaction mixture to kill the catalyst. The reaction mixture was then poured into isopropyl alcohol to coagulate the polybutadiene. The polymer was washed and dried. Infrared analysis indicated that the polymer had the following structure: 96.6% cis, 1,4, 2.5% 1,2, 0.9% trans 1,4. Intrinsic viscosity in toluene was 1.85.

100 parts of the polybutadiene prepared as above was easily mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part of sulfur and the product cured for 25 minutes at 135° C. The resulting product was a hard rubbery sheet having good resiliency even at low temperatures and good abrasion resistance.

Example III

This example illustrates the preparation of polybutadiene having a high cis 1,4 content employed an anhydrous nickel chloride-aluminum triethyl catalyst in the presence of vinyl cyclohexene-3.

40 parts of vinyl cyclohexene-3, 12 parts of dry butadiene and 2 parts of a benzene solution of a catalyst prepared by reacting 18 parts of anhydrous nickel chloride with 9 parts of aluminum triethyl in 300 parts of benzene were added to a glass ampoule. Nitrogen was passed into the ampoule to remove any molecular oxygen and the ampoule sealed and maintained at about 30° C. for several hours. The ampoule was then opened and 1 part of isopropyl alcohol added to kill the catalyst.

The reaction mixture was then poured into isopropyl alcohol to coagulate the polybutadiene. The polymer was washed and dried. Infrared analysis indicated the polymer had a cis 1,4 content about 95%. Intrinsic viscosity in toluene was about 1.0.

The product was easily formed into a rubber as in Example I.

Example IV

This example illustrates the preparation of polyisoprene employing a cobaltous chloride-aluminum ethyl sesquichloride catalyst in the presence of vinyl cyclohexene-3.

40 parts of vinyl cyclohexene-3, 12 parts of dry isoprene and 2 parts of a benzene solution of catalyst giving 6 parts and 200 parts respectively of cobaltous chloride and aluminum ethyl sesquichloride per million parts of final reaction mixture were added to a glass ampoule. Nitrogen was passed into the ampoule to remove any molecular oxygen and the ampoule sealed and maintained at about 30° C. for several hours. The ampoule was then opened and 1 part of isopropyl alcohol added to the reaction mixture to kill the catalyst. The reaction mixture was then poured into isopropyl alcohol to coagulate the polyisoprene. The polymer was washed and dried. Infrared analysis indicates the polymer had a high cis 1,4 structure and a low intrinsic viscosity.

100 parts of the polyisoprene prepared as above was mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part sulfur and the product cured for 25 minutes at 135° C. The resulting product was a hard rubbery sheet having good resiliency and good abrasion resistance.

Example V

Examples I to IV are repeated with the exception that limonene and 1-vinyl-cyclopentene-2 are used in place of the vinyl-cyclohexene-3. Related products are obtained.

Example VI

Examples I to V are repeated with the exception that the monomer employed is a mixture of 90 parts butadiene and 10 parts of isoprene. The resulting products had low molecular weights and high cis 1,4 structure.

Example VII

Examples I to IV are repeated with the exception that the amount of the vinylcycloolefin is increased .5 times so as to produce a lower mol weight polymer and decreased .5 times to produce a higher mol weight polymer. The vinylcycloolefin removed is replaced with benzene.

I claim as my invention:

1. A process for polymerizing conjugated diolefin hydrocarbons which comprises contacting the diolefin with a catalyst of the group consisting of cobaltous and divalent nickel halides in combination with co-catalyst consisting of aluminum alkyl having from 1 to 8 carbon atoms per alkyl group in a substantially anhydrous solution containing at least 0.2 times the weight of the monomer of a non-conjugated vinyl cycloolefin at a temperature between 0° and 100° C. in the substantial absence of molecular oxygen and under substantially anhydrous conditions, and recovering as polymerization product a rubbery polymer of high cis-1,4 addition product content.

2. A process as in claim 1 wherein the conjugated diolefin is butadiene.

3. A process as in claim 1 wherein the conjugated diolefin is isoprene.

4. A process as in claim 1 wherein the catalyst is cobaltous chloride.

5. A process as in claim 1 wherein the co-catalyst is an aluminum alkyl sesquihalide.

6. A process as in claim 1 wherein the co-catalyst is an aluminum trialkyl.

7. A process as in claim 1 wherein the catalyst is cobaltous chloride and the co-catalyst is aluminum ethyl sesquichloride.

8. A process as in claim 1 wherein the catalyst is cobaltous chloride and the co-catalyst is an aluminum trialkyl.

9. A process as in claim 1 wherein the temperature employed in the process is between 15° C. to 60° C.

10. A process as in claim 1 wherein the amount of the vinyl cycloolefin is between .2 and 2 times the weight of the monomer.

11. A process as in claim 1 wherein the vinylcycloolefin is 1-vinylcyclohexene-3.

12. A process as in claim 1 wherein the vinylcycloolefin is vinylcyclopentene-2.

13. A process for producing rubbery polybutadiene having a high cis 1,4 structure and a workable molecular weight which comprises polymerizing the butadiene in the presence of a catalyst of the group consisting of divalent cobalt and divalent nickel halides in combination with a co-catalyst consisting of aluminum alkyl having 1 to 8 carbon atoms per alkyl group in a solution containing at least .2 times the weight of butadiene of vinylcyclohexene-3 at a temperature between 15° C. and 60° C. in the substantial absence of molecular oxygen and under substantially anhydrous conditions.

14. A process for producing rubbery polybutadiene having a high cis-1,4 structure and a workable molecular weight, which comprises polymerizing butadiene in the presence of cobaltous chloride-aluminum alkyl sesquichloride catalyst in a solution containing between 0.2 and 2 times the weight of the monomer of vinyl cyclohexene-3 at a temperature between 15° C. and 60° C. in the substantial absence of molecular oxygen and under substantially anhydrous conditions.

References Cited in the file of this patent

UNITED STATES PATENTS

| | | |
|---|---|---|
| 2,388,514 | Zwicker et al. | Nov. 6, 1945 |
| 2,451,180 | Stewart | Oct. 12, 1948 |
| 2,582,693 | Gleason | Jan. 15, 1952 |
| 2,905,659 | Miller et al. | Sept. 22, 1959 |

FOREIGN PATENTS

| | | |
|---|---|---|
| 776,326 | Great Britain | June 5, 1957 |
| 779,781 | Great Britain | Jan. 29, 1958 |

OTHER REFERENCES

Uraneck et al.: Ind. & Eng. Chem., volume 47, No. 9, September 1955, pages 1724–1729.